(12) United States Patent
Steinman et al.

(10) Patent No.: US 10,266,031 B2
(45) Date of Patent: *Apr. 23, 2019

(54) VEHICLE HEADLINER ASSEMBLY FOR ZONAL COMFORT

(71) Applicant: Gentherm Incorporated, Northville, MI (US)

(72) Inventors: Adam Joseph Steinman, Ferndale, MI (US); Kenneth James Bunyak, Fowlerville, MI (US); Bruno Antonio Orlando, Windsor (CA)

(73) Assignee: GENTHERM INCORPORATED, Northville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,787

(22) Filed: Apr. 24, 2017

(65) Prior Publication Data

US 2017/0291467 A1 Oct. 12, 2017

Related U.S. Application Data

(63) Continuation of application No. 14/532,892, filed on Nov. 4, 2014, now Pat. No. 9,662,962.

(Continued)

(51) Int. Cl.
*B60H 1/00* (2006.01)
*B60H 1/24* (2006.01)
(Continued)

(52) U.S. Cl.
CPC ..... *B60H 1/00064* (2013.01); *B60H 1/00028* (2013.01); *B60H 1/00207* (2013.01);
(Continued)

(58) Field of Classification Search
CPC ............ B60H 1/00064; B60H 1/00028; B60H 1/00564; B60H 1/245; B60H 1/00742;
(Continued)

(56) References Cited

U.S. PATENT DOCUMENTS 1,839,156 A 12/1931 Lumpkin
2,235,620 A 3/1941 Nessell
(Continued)

FOREIGN PATENT DOCUMENTS

CA 979490 12/1975
CN 2128076 3/1993
(Continued)

OTHER PUBLICATIONS

U.S. Appl. No. 15/627,098, filed Jun. 19, 2017, Petrovski et al.
(Continued)

*Primary Examiner* — Emmanuel Duke
(74) *Attorney, Agent, or Firm* — Knobbe, Martens, Olson & Bear, LLP (57) ABSTRACT

According to some embodiments, a zonal conditioning system for a vehicle comprises a headliner assembly configured to be secured to the top surface of a vehicle interior, wherein the headliner assembly comprises a first side positioned away from the vehicle interior and hidden from the vehicle interior, and a second side positioned toward the vehicle interior, the headliner assembly comprising at least two vents through which air selectively passes. The zonal conditioning system further includes at least two fluid modules positioned along the first side of the headliner assembly, wherein each of the fluid modules comprises a fluid transfer device and an outlet. In some embodiments, at least one property of the air discharged through the first and second vents can be selectively regulated to create separate conditioning zones within the interior of the vehicle.

20 Claims, 7 Drawing Sheets

Related U.S. Application Data (60) Provisional application No. 61/900,334, filed on Nov. 5, 2013.

(51) Int. Cl.
*F25B 21/02* (2006.01)
*F25B 21/04* (2006.01)
*B60H 1/22* (2006.01)

(52) U.S. Cl.
CPC ..... *B60H 1/00564* (2013.01); *B60H 1/00964* (2013.01); *B60H 1/2225* (2013.01); *B60H 1/245* (2013.01); *F25B 21/02* (2013.01); *F25B 21/04* (2013.01); *B60H 2001/00085* (2013.01); *B60H 2001/00128* (2013.01); *B60H 2001/00235* (2013.01); *B60H 2001/224* (2013.01); *B60H 2001/229* (2013.01)

(58) Field of Classification Search
CPC ............ B60H 1/00207; B60H 1/00964; B60H 2001/224; B60H 2001/00128; B60H 2001/00235; B60H 2001/00085; B60R 13/0225
See application file for complete search history.

(56) References Cited

U.S. PATENT DOCUMENTS

| | | |
|---|---|---|
| 2,362,259 A | 11/1944 | Findley |
| 2,363,168 A | 11/1944 | Findley |
| 2,461,432 A | 2/1949 | Mitchell |
| 2,462,984 A | 3/1949 | Maddison |
| 2,493,067 A | 1/1950 | Goldsmith |
| 2,512,559 A | 6/1950 | Williams |
| 2,519,241 A | 8/1950 | Findley |
| 2,782,834 A | 2/1957 | Vigo |
| 2,791,956 A | 5/1957 | Guest |
| 2,813,708 A | 11/1957 | Frey |
| 2,884,956 A | 5/1959 | Perlin |
| 2,931,286 A | 4/1960 | Fry, Sr. et al. |
| 2,959,017 A | 11/1960 | Gilman et al. |
| 2,976,700 A | 3/1961 | Jackson |
| 2,984,077 A | 5/1961 | Gaskill |
| 3,019,609 A | 2/1962 | Pietsch |
| 3,030,145 A | 4/1962 | Kottemann |
| 3,039,817 A | 6/1962 | Taylor |
| 3,077,079 A | 2/1963 | Pietsch |
| 3,085,405 A | 4/1963 | Frantti |
| 3,090,206 A | 5/1963 | Anders |
| 3,136,577 A | 6/1964 | Richard |
| 3,137,142 A | 6/1964 | Venema |
| 3,137,523 A | 6/1964 | Karner |
| 3,138,934 A | 6/1964 | Roane |
| 3,178,894 A | 4/1965 | Mole et al. |
| 3,186,240 A | 6/1965 | Daubert |
| 3,197,342 A | 7/1965 | Neild |
| 3,212,275 A | 10/1965 | Tillman |
| 3,240,628 A | 3/1966 | Sonntag, Jr. |
| 3,253,649 A | 5/1966 | Laing |
| 3,266,064 A | 8/1966 | Figman |
| 3,282,267 A | 11/1966 | Eidus |
| 3,298,195 A | 1/1967 | Raskhodoff |
| 3,300,649 A | 1/1967 | Strawn |
| 3,325,312 A | 6/1967 | Sonntag, Jr. |
| 3,326,727 A | 6/1967 | Fritts |
| 3,351,498 A | 11/1967 | Shinn et al. |
| 3,366,164 A | 1/1968 | Newton |
| 3,392,535 A | 7/1968 | De Castelet |
| 3,486,177 A | 12/1969 | Marshack |
| 3,529,310 A | 9/1970 | Olmo |
| 3,550,523 A | 12/1970 | Segal |
| 3,599,437 A | 8/1971 | Panas |
| 3,615,870 A | 10/1971 | Crouthamel |
| 3,627,299 A | 12/1971 | Schwartze et al. |
| 3,632,451 A | 1/1972 | Abbott |
| 3,640,456 A | 2/1972 | Sturgis |
| 3,648,469 A | 3/1972 | Chapman |
| 3,681,797 A | 8/1972 | Messner |
| 3,703,141 A | 11/1972 | Pernoud |
| 3,767,470 A | 10/1973 | Hines |
| 3,786,230 A | 1/1974 | Brandenburg, Jr. |
| 3,818,522 A | 6/1974 | Schuster |
| 3,819,418 A | 6/1974 | Winkler et al. |
| 3,839,876 A | 10/1974 | Privas |
| 3,870,568 A | 3/1975 | Oesterhelt et al. |
| 3,876,860 A | 4/1975 | Nomura et al. |
| 3,894,213 A | 7/1975 | Agarwala |
| 3,899,054 A | 8/1975 | Huntress et al. |
| 3,902,923 A | 9/1975 | Evans et al. |
| 3,916,151 A | 10/1975 | Reix |
| 3,926,052 A | 12/1975 | Bechtel |
| 3,927,299 A | 12/1975 | Sturgis |
| 3,928,876 A | 12/1975 | Starr |
| 4,002,108 A | 1/1977 | Drori |
| 4,044,824 A | 8/1977 | Eskeli |
| 4,124,794 A | 11/1978 | Eder |
| 4,195,687 A | 4/1980 | Taziker |
| 4,223,205 A | 9/1980 | Sturgis |
| 4,224,565 A | 9/1980 | Sosniak et al. |
| 4,281,516 A | 8/1981 | Berthet et al. |
| 4,315,599 A | 2/1982 | Biancardi |
| 4,336,444 A | 6/1982 | Bice et al. |
| 4,338,944 A | 7/1982 | Arkans |
| 4,391,009 A | 7/1983 | Schild et al. |
| 4,413,857 A | 11/1983 | Hayashi |
| 4,423,308 A | 12/1983 | Callaway et al. |
| 4,437,702 A | 3/1984 | Agosta |
| 4,438,070 A | 3/1984 | Stephens et al. |
| 4,459,428 A | 7/1984 | Chou |
| 4,491,173 A | 1/1985 | Demand |
| 4,493,939 A | 1/1985 | Blaske et al. |
| 4,497,973 A | 2/1985 | Heath et al. |
| 4,506,510 A | 3/1985 | Tircot |
| 4,518,700 A | 5/1985 | Stephens |
| 4,518,847 A | 5/1985 | Horst, Sr. et al. |
| 4,549,134 A | 10/1985 | Weiss |
| 4,554,968 A | 11/1985 | Haas |
| 4,567,351 A | 1/1986 | Kitagawa et al. |
| 4,572,430 A | 2/1986 | Takagi et al. |
| 4,639,883 A | 1/1987 | Michaelis |
| 4,665,707 A | 5/1987 | Hamilton |
| 4,671,567 A | 6/1987 | Frobose |
| 4,677,416 A | 6/1987 | Nishimoto et al. |
| 4,685,727 A | 8/1987 | Cremer et al. |
| 4,688,390 A | 8/1987 | Sawyer |
| 4,704,320 A | 11/1987 | Mizunoya et al. |
| 4,711,294 A | 12/1987 | Jacobs et al. |
| 4,712,832 A | 12/1987 | Antolini et al. |
| 4,777,802 A | 10/1988 | Feher |
| 4,782,664 A | 11/1988 | Sterna et al. |
| 4,791,274 A | 12/1988 | Horst |
| 4,793,651 A | 12/1988 | Inagaki et al. |
| 4,802,929 A | 2/1989 | Schock |
| 4,812,733 A | 3/1989 | Tobey |
| 4,823,554 A | 4/1989 | Trachtenberg et al. |
| 4,825,488 A | 5/1989 | Bedford |
| 4,828,627 A | 5/1989 | Connery |
| 4,847,933 A | 7/1989 | Bedford |
| 4,853,992 A | 8/1989 | Yu |
| 4,923,248 A | 5/1990 | Feher |
| 4,947,648 A | 8/1990 | Harwell et al. |
| 4,969,684 A | 11/1990 | Zarotti |
| 4,981,324 A | 1/1991 | Law |
| 4,988,847 A | 1/1991 | Argos et al. |
| 4,997,230 A | 3/1991 | Spitalnick |
| 5,002,336 A | 3/1991 | Feher |
| 5,012,325 A | 4/1991 | Mansuria et al. |
| 5,014,909 A | 5/1991 | Yasuo |
| 5,016,304 A | 5/1991 | Ryhiner |
| 5,022,462 A | 6/1991 | Flint et al. |
| 5,057,490 A | 10/1991 | Skertic |
| 5,070,937 A | 12/1991 | Mougin et al. |
| 5,077,709 A | 12/1991 | Feher |

(56) References Cited

U.S. PATENT DOCUMENTS

| | | |
|---|---|---|
| 5,088,790 A | 2/1992 | Wainwright et al. |
| 5,097,674 A | 3/1992 | Imaiida et al. |
| 5,102,189 A | 4/1992 | Saito et al. |
| 5,106,161 A | 4/1992 | Meiller |
| 5,111,025 A | 5/1992 | Barma et al. |
| 5,111,664 A | 5/1992 | Yang |
| 5,117,638 A | 6/1992 | Feher |
| 5,119,640 A | 6/1992 | Conrad |
| 5,125,238 A | 6/1992 | Ragan et al. |
| 5,148,977 A | 9/1992 | Hibino et al. |
| 5,166,777 A | 11/1992 | Kataoka |
| 5,187,349 A | 2/1993 | Curhan et al. |
| 5,188,286 A | 2/1993 | Pence, IV |
| 5,226,188 A | 7/1993 | Liou |
| 5,255,735 A | 10/1993 | Raghava et al. |
| 5,256,857 A | 10/1993 | Curhan et al. |
| 5,265,599 A | 11/1993 | Stephenson et al. |
| 5,278,936 A | 1/1994 | Shao |
| 5,279,128 A | 1/1994 | Tomatsu et al. |
| 5,335,381 A | 8/1994 | Chang |
| 5,367,728 A | 11/1994 | Chang |
| 5,372,402 A | 12/1994 | Kuo |
| 5,375,421 A | 12/1994 | Hsieh |
| 5,382,075 A | 1/1995 | Shih |
| 5,385,382 A | 1/1995 | Single, II et al. |
| 5,409,547 A | 4/1995 | Watanabe et al. |
| 5,413,166 A | 5/1995 | Kerner et al. |
| 5,416,935 A | 5/1995 | Nieh |
| 5,419,489 A | 5/1995 | Burd |
| 5,419,780 A | 5/1995 | Suski |
| 5,430,322 A | 7/1995 | Koyanagi et al. |
| 5,448,788 A | 9/1995 | Wu |
| 5,448,891 A | 9/1995 | Nakagiri et al. |
| 5,456,081 A | 10/1995 | Chrysler et al. |
| 5,473,783 A | 12/1995 | Allen |
| 5,493,742 A | 2/1996 | Klearman |
| 5,493,864 A | 2/1996 | Pomerence et al. |
| 5,497,632 A | 3/1996 | Robinson |
| 5,505,520 A | 4/1996 | Frusti et al. |
| 5,515,238 A | 5/1996 | Fritz et al. |
| 5,524,439 A | 6/1996 | Gallup et al. |
| 5,542,503 A | 8/1996 | Dunn et al. |
| 5,544,487 A | 8/1996 | Attey et al. |
| 5,544,488 A | 8/1996 | Reid |
| 5,555,732 A | 9/1996 | Whiticar |
| 5,561,981 A | 10/1996 | Quisenberry et al. |
| 5,576,512 A | 11/1996 | Doke |
| 5,584,084 A | 12/1996 | Klearman et al. |
| 5,584,183 A | 12/1996 | Wright et al. |
| 5,597,200 A | 1/1997 | Gregory et al. |
| 5,601,399 A | 2/1997 | Okpara et al. |
| 5,606,639 A | 2/1997 | Lehoe et al. |
| 5,613,729 A | 3/1997 | Summer, Jr. |
| 5,613,730 A | 3/1997 | Buie et al. |
| 5,623,828 A | 4/1997 | Harrington |
| 5,626,021 A | 5/1997 | Karunasiri et al. |
| 5,626,386 A | 5/1997 | Lush |
| 5,634,342 A | 6/1997 | Peeters et al. |
| 5,637,921 A | 6/1997 | Burward-Hoy |
| 5,640,728 A | 6/1997 | Graebe |
| 5,642,539 A | 7/1997 | Kuo |
| 5,645,314 A | 7/1997 | Liou |
| 5,650,904 A | 7/1997 | Gilley et al. |
| 5,653,741 A | 8/1997 | Grant |
| 5,667,622 A | 9/1997 | Hasegawa et al. |
| 5,675,852 A | 10/1997 | Watkins |
| 5,690,849 A | 11/1997 | DeVilbiss et al. |
| 5,692,952 A | 12/1997 | Chih-Hung |
| 5,704,213 A | 1/1998 | Smith et al. |
| 5,715,695 A | 2/1998 | Lord |
| 5,721,804 A | 2/1998 | Greene, III |
| 5,724,818 A | 3/1998 | Iwata et al. |
| 5,729,981 A | 3/1998 | Markus et al. |
| 5,761,908 A | 6/1998 | Oas et al. |
| 5,761,909 A | 6/1998 | Hughes et al. |
| 5,798,583 A | 8/1998 | Morita |
| 5,800,490 A | 9/1998 | Patz et al. |
| 5,802,855 A | 9/1998 | Yamaguchi et al. |
| 5,802,856 A | 9/1998 | Schaper et al. |
| 5,822,993 A | 10/1998 | Attey |
| 5,827,424 A | 10/1998 | Gillis et al. |
| 5,833,321 A | 11/1998 | Kim et al. |
| 5,850,741 A | 12/1998 | Feher |
| 5,865,031 A | 2/1999 | Itakura |
| 5,871,151 A | 2/1999 | Fiedrich |
| 5,884,485 A | 3/1999 | Yamaguchi et al. |
| 5,884,486 A | 3/1999 | Hughes et al. |
| 5,887,304 A | 3/1999 | Von der Heyde |
| 5,888,261 A | 3/1999 | Fortune |
| 5,895,964 A | 4/1999 | Nakayama |
| 5,902,014 A | 5/1999 | Dinkel et al. |
| 5,921,100 A | 7/1999 | Yoshinori et al. |
| 5,921,314 A | 7/1999 | Schuller et al. |
| 5,921,858 A | 7/1999 | Kawai et al. |
| 5,924,289 A | 7/1999 | Bishop, II |
| 5,924,766 A | 7/1999 | Esaki et al. |
| 5,924,767 A | 7/1999 | Pietryga |
| 5,927,599 A | 7/1999 | Kath |
| 5,927,817 A | 7/1999 | Ekman et al. |
| 5,934,748 A | 8/1999 | Faust et al. |
| 5,936,192 A | 8/1999 | Tauchi |
| 5,937,908 A | 8/1999 | Inoshiri et al. |
| 5,948,303 A | 9/1999 | Larson |
| 5,950,067 A | 9/1999 | Maegawa et al. |
| 5,952,728 A | 9/1999 | Imanishi et al. |
| 5,987,893 A | 11/1999 | Schultz-Harder et al. |
| 5,988,568 A | 11/1999 | Drews |
| 5,992,154 A | 11/1999 | Kawada et al. |
| 5,994,637 A | 11/1999 | Imanushi et al. |
| 5,995,711 A | 11/1999 | Fukuoka et al. |
| 6,000,225 A | 12/1999 | Ghoshal |
| 6,003,950 A | 12/1999 | Larsson |
| 6,006,524 A | 12/1999 | Park |
| 6,019,420 A | 2/2000 | Faust et al. |
| 6,038,865 A | 3/2000 | Watanabe et al. |
| 6,048,024 A | 4/2000 | Wallman |
| 6,049,655 A | 4/2000 | Vazirani |
| 6,052,853 A | 4/2000 | Schmid |
| 6,053,163 A | 4/2000 | Bass |
| 6,059,018 A | 5/2000 | Yoshinori et al. |
| 6,062,641 A | 5/2000 | Suzuki et al. |
| 6,072,924 A | 6/2000 | Sato et al. |
| 6,072,938 A | 6/2000 | Peterson et al. |
| 6,073,998 A | 6/2000 | Siarkowski et al. |
| 6,079,485 A | 6/2000 | Esaki et al. |
| 6,084,172 A | 7/2000 | Kishi et al. |
| 6,085,369 A | 7/2000 | Feher |
| 6,086,831 A | 7/2000 | Harness et al. |
| 6,087,638 A | 7/2000 | Silverbrook |
| 6,094,919 A | 8/2000 | Bhatia |
| 6,097,088 A | 8/2000 | Sakuragi |
| 6,100,463 A | 8/2000 | Ladd et al. |
| 6,101,815 A | 8/2000 | Van Oort et al. |
| 6,105,373 A | 8/2000 | Watanabe et al. |
| 6,109,688 A | 8/2000 | Wurz et al. |
| 6,112,525 A | 9/2000 | Yoshida et al. |
| 6,112,531 A | 9/2000 | Yamaguchi |
| 6,116,029 A | 9/2000 | Krawec |
| 6,119,463 A | 9/2000 | Bell |
| 6,120,370 A | 9/2000 | Asou et al. |
| 6,127,619 A | 10/2000 | Xi et al. |
| 6,141,969 A | 11/2000 | Launchbury et al. |
| 6,145,925 A | 11/2000 | Eksin et al. |
| 6,158,224 A | 12/2000 | Hu et al. |
| 6,161,241 A | 12/2000 | Zysman |
| 6,161,388 A | 12/2000 | Ghoshal |
| 6,164,076 A | 12/2000 | Chu et al. |
| 6,164,719 A | 12/2000 | Rauh |
| 6,171,333 B1 | 1/2001 | Nelson et al. |
| 6,178,292 B1 | 1/2001 | Fukuoka et al. |
| 6,179,706 B1 | 1/2001 | Yoshinori et al. |
| 6,186,592 B1 | 2/2001 | Orizakis et al. |
| 6,189,966 B1 | 2/2001 | Faust et al. |
| 6,189,967 B1 | 2/2001 | Short |

(56) References Cited

U.S. PATENT DOCUMENTS

| | | |
|---|---|---|
| 6,196,627 B1 | 3/2001 | Faust et al. |
| 6,196,839 B1 | 3/2001 | Ross |
| 6,206,465 B1 | 3/2001 | Faust et al. |
| 6,213,198 B1 | 4/2001 | Shikata et al. |
| 6,222,243 B1 | 4/2001 | Kishi et al. |
| 6,223,539 B1 | 5/2001 | Bell |
| 6,233,959 B1 | 5/2001 | Kang et al. |
| 6,250,083 B1 | 6/2001 | Chou |
| 6,256,996 B1 | 7/2001 | Ghoshal |
| 6,262,357 B1 | 7/2001 | Johnson et al. |
| 6,263,530 B1 | 7/2001 | Feher |
| 6,266,962 B1 | 7/2001 | Ghoshal |
| 6,282,907 B1 | 9/2001 | Ghoshal |
| 6,289,982 B1 | 9/2001 | Naji |
| 6,291,803 B1 | 9/2001 | Fourrey |
| 6,306,673 B1 | 10/2001 | Imanishi et al. |
| 6,326,610 B1 | 12/2001 | Muramatsu et al. |
| 6,336,237 B1 | 1/2002 | Schmid |
| 6,338,251 B1 | 1/2002 | Ghoshal |
| 6,341,395 B1 | 1/2002 | Chao |
| 6,347,521 B1 | 2/2002 | Kadotani et al. |
| 6,378,311 B1 | 4/2002 | McCordic |
| 6,385,976 B1 | 5/2002 | Yamamura et al. |
| 6,391,676 B1 | 5/2002 | Tsuzaki et al. |
| 6,393,842 B2 | 5/2002 | Kim et al. |
| 6,400,013 B1 | 6/2002 | Tsuzaki et al. |
| 6,402,470 B1 | 6/2002 | Kvasnak et al. |
| 6,410,971 B1 | 6/2002 | Otey |
| 6,425,527 B1 | 7/2002 | Smole |
| 6,427,449 B1 | 8/2002 | Logan et al. |
| 6,434,328 B2 | 8/2002 | Rutherford |
| 6,452,740 B1 | 9/2002 | Ghoshal |
| 6,470,696 B1 | 10/2002 | Palfy et al. |
| 6,474,073 B1 | 11/2002 | Uetsuji et al. |
| 6,481,801 B1 | 11/2002 | Schmale |
| 6,487,739 B1 | 12/2002 | Harker |
| 6,489,551 B2 | 12/2002 | Chu et al. |
| 6,490,879 B1 | 12/2002 | Lloyd et al. |
| 6,492,585 B1 | 12/2002 | Zamboni et al. |
| 6,493,888 B1 | 12/2002 | Salvatini et al. |
| 6,493,889 B2 | 12/2002 | Kocurek |
| 6,509,704 B1 | 1/2003 | Brown |
| 6,511,125 B1 | 1/2003 | Gendron |
| 6,519,949 B1 | 2/2003 | Wernlund et al. |
| 6,539,725 B2 | 4/2003 | Bell |
| 6,541,737 B1 | 4/2003 | Eksin et al. |
| 6,541,743 B2 | 4/2003 | Chen |
| 6,546,576 B1 | 4/2003 | Lin |
| 6,548,894 B2 | 4/2003 | Chu et al. |
| 6,552,256 B2 | 4/2003 | Shakouri et al. |
| RE38,128 E | 6/2003 | Gallup et al. |
| 6,571,564 B2 | 6/2003 | Upadhye et al. |
| 6,573,596 B2 | 6/2003 | Saika |
| 6,574,967 B1 | 6/2003 | Park et al. |
| 6,580,025 B2 | 6/2003 | Guy |
| 6,581,225 B1 | 6/2003 | Imai |
| 6,583,638 B2 | 6/2003 | Costello et al. |
| 6,598,251 B2 | 7/2003 | Habboub et al. |
| 6,598,405 B2 | 7/2003 | Bell |
| 6,604,576 B2 | 8/2003 | Noda et al. |
| 6,604,785 B2 | 8/2003 | Bargheer et al. |
| 6,605,955 B1 | 8/2003 | Costello et al. |
| 6,606,754 B1 | 8/2003 | Flick |
| 6,606,866 B2 | 8/2003 | Bell |
| 6,619,044 B2 | 9/2003 | Batchelor et al. |
| 6,619,736 B2 | 9/2003 | Stowe et al. |
| 6,625,990 B2 | 9/2003 | Bell |
| 6,626,488 B2 | 9/2003 | Pfahler |
| 6,629,724 B2 | 10/2003 | Ekern et al. |
| 6,637,210 B2 | 10/2003 | Bell |
| 6,644,735 B2 | 11/2003 | Bargheer et al. |
| 6,672,076 B2 | 1/2004 | Bell |
| 6,676,207 B2 | 1/2004 | Rauh et al. |
| 6,684,437 B2 | 2/2004 | Koenig |
| 6,686,532 B1 | 2/2004 | Macris |
| 6,687,937 B2 | 2/2004 | Harker |
| 6,695,402 B2 | 2/2004 | Sloan, Jr. |
| 6,700,052 B2 | 3/2004 | Bell |
| 6,705,089 B2 | 3/2004 | Chu et al. |
| 6,708,352 B2 | 3/2004 | Salvatini et al. |
| 6,711,767 B2 | 3/2004 | Klamm |
| 6,711,904 B1 | 3/2004 | Law et al. |
| 6,719,039 B2 | 4/2004 | Calaman et al. |
| 6,725,669 B2 | 4/2004 | Melaragni |
| 6,727,422 B2 | 4/2004 | Macris |
| 6,730,115 B1 | 5/2004 | Heaton |
| 6,739,138 B2 | 5/2004 | Saunders et al. |
| 6,739,655 B1 | 5/2004 | Schwochert et al. |
| 6,743,972 B2 | 6/2004 | Macris |
| 6,761,399 B2 | 7/2004 | Bargheer et al. |
| 6,764,502 B2 | 7/2004 | Bieberich |
| 6,767,766 B2 | 7/2004 | Chu et al. |
| 6,772,829 B2 | 8/2004 | Lebrun |
| 6,774,346 B2 | 8/2004 | Clothier |
| 6,786,541 B2 | 9/2004 | Haupt et al. |
| 6,786,545 B2 | 9/2004 | Bargheer et al. |
| 6,790,481 B2 | 9/2004 | Bishop et al. |
| 6,793,016 B2 | 9/2004 | Aoki et al. |
| 6,804,966 B1 | 10/2004 | Chu et al. |
| 6,808,230 B2 | 10/2004 | Buss et al. |
| 6,812,395 B2 | 11/2004 | Bell |
| 6,815,814 B2 | 11/2004 | Chu et al. |
| 6,817,191 B2 | 11/2004 | Watanabe |
| 6,817,197 B1 | 11/2004 | Padfield |
| 6,817,675 B2 | 11/2004 | Buss et al. |
| 6,818,817 B2 | 11/2004 | Macris |
| 6,823,678 B1 | 11/2004 | Li |
| 6,828,528 B2 | 12/2004 | Stowe et al. |
| 6,834,509 B2 | 12/2004 | Palfy et al. |
| 6,840,305 B2 | 1/2005 | Zheng et al. |
| 6,840,576 B2 | 1/2005 | Ekern et al. |
| 6,841,957 B2 | 1/2005 | Brown |
| 6,845,622 B2 | 1/2005 | Sauciuc et al. |
| 6,855,158 B2 | 2/2005 | Stolpmann |
| 6,855,880 B2 | 2/2005 | Feher |
| 6,857,697 B2 | 2/2005 | Brennan et al. |
| 6,857,954 B2 | 2/2005 | Luedtke |
| 6,868,690 B2 | 3/2005 | Faqih |
| 6,871,365 B2 | 3/2005 | Flick et al. |
| 6,886,351 B2 | 5/2005 | Palfy et al. |
| 6,892,807 B2 | 5/2005 | Fristedt et al. |
| 6,893,086 B2 | 5/2005 | Bajic et al. |
| 6,904,629 B2 | 6/2005 | Wu |
| 6,907,739 B2 | 6/2005 | Bell |
| 6,923,216 B2 | 8/2005 | Extrand et al. |
| 6,935,122 B2 | 8/2005 | Huang |
| 6,954,944 B2 | 10/2005 | Feher |
| 6,959,555 B2 | 11/2005 | Bell |
| 6,962,195 B2 | 11/2005 | Smith et al. |
| 6,963,053 B2 | 11/2005 | Lutz |
| 6,967,309 B2 | 11/2005 | Wyatt et al. |
| 6,976,734 B2 | 12/2005 | Stoewe |
| 6,977,360 B2 | 12/2005 | Weiss |
| 6,981,380 B2 | 1/2006 | Chrysler et al. |
| 6,990,701 B1 | 1/2006 | Litvak |
| 7,000,490 B1 | 2/2006 | Micheels |
| 7,036,163 B2 | 5/2006 | Schmid |
| 7,040,710 B2 | 5/2006 | White et al. |
| 7,052,091 B2 | 5/2006 | Bajic et al. |
| 7,063,163 B2 | 6/2006 | Steele et al. |
| 7,066,306 B2 | 6/2006 | Gavin |
| 7,070,231 B1 | 7/2006 | Wong |
| 7,070,232 B2 | 7/2006 | Minegishi et al. |
| 7,075,034 B2 | 7/2006 | Bargheer et al. |
| 7,082,772 B2 | 8/2006 | Welch |
| 7,084,502 B2 | 8/2006 | Bottner et al. |
| 7,100,978 B2 | 9/2006 | Ekern et al. |
| 7,108,319 B2 | 9/2006 | Hartwich et al. |
| 7,111,465 B2 | 9/2006 | Bell |
| 7,114,771 B2 | 10/2006 | Lofy et al. |
| 7,124,593 B2 | 10/2006 | Feher |
| 7,131,689 B2 | 11/2006 | Brennan et al. |
| 7,134,715 B1 | 11/2006 | Fristedt et al. |
| 7,141,763 B2 | 11/2006 | Moroz |

(56) References Cited

U.S. PATENT DOCUMENTS

| | | |
|---|---|---|
| 7,147,279 B2 | 12/2006 | Bevan et al. |
| 7,165,281 B2 | 1/2007 | Larssson et al. |
| 7,168,758 B2 | 1/2007 | Bevan et al. |
| 7,178,344 B2 | 2/2007 | Bell |
| 7,201,441 B2 | 4/2007 | Stoewe et al. |
| 7,213,876 B2 | 5/2007 | Stoewe |
| 7,220,048 B2 | 5/2007 | Kohlgrüber et al. |
| 7,224,059 B2 | 5/2007 | Shimada et al. |
| 7,231,772 B2 | 6/2007 | Bell |
| 7,244,887 B2 | 7/2007 | Miley |
| 7,246,496 B2 | 7/2007 | Goenka et al. |
| 7,272,936 B2 | 9/2007 | Feher |
| 7,273,981 B2 | 9/2007 | Bell |
| 7,299,639 B2 | 11/2007 | Leija et al. |
| 7,337,615 B2 | 3/2008 | Reidy |
| 7,338,117 B2 | 3/2008 | Iqbal et al. |
| 7,340,907 B2 | 3/2008 | Vogh et al. |
| 7,355,146 B2 | 4/2008 | Angelis et al. |
| 7,356,912 B2 | 4/2008 | Iqbal et al. |
| 7,360,365 B2 | 4/2008 | Codecasa et al. |
| 7,360,416 B2 | 4/2008 | Manaka et al. |
| 7,370,479 B2 | 5/2008 | Pfannenberg |
| 7,370,911 B2 | 5/2008 | Bajic et al. |
| 7,380,586 B2 | 6/2008 | Gawthrop |
| 7,425,034 B2 | 9/2008 | Bajic et al. |
| 7,426,835 B2 | 9/2008 | Bell et al. |
| 7,462,028 B2 | 12/2008 | Cherala et al. |
| 7,469,432 B2 | 12/2008 | Chambers |
| 7,475,464 B2 | 1/2009 | Lofy et al. |
| 7,475,938 B2 | 1/2009 | Stoewe et al. |
| 7,478,869 B2 | 1/2009 | Lazanja et al. |
| 7,480,950 B2 | 1/2009 | Feher |
| 7,506,924 B2 | 3/2009 | Bargheer et al. |
| 7,506,938 B2 | 3/2009 | Brennan et al. |
| 7,513,273 B2 | 4/2009 | Bivin |
| 7,581,785 B2 | 9/2009 | Heckmann et al. |
| 7,587,901 B2 | 9/2009 | Petrovski |
| 7,587,902 B2 | 9/2009 | Bell |
| 7,591,507 B2 | 9/2009 | Giffin et al. |
| 7,608,777 B2 | 10/2009 | Bell et al. |
| 7,621,594 B2 | 11/2009 | Hartmann et al. |
| 7,640,754 B2 | 1/2010 | Wolas |
| 7,665,803 B2 | 2/2010 | Wolas |
| 7,708,338 B2 | 5/2010 | Wolas |
| 7,731,279 B2 | 6/2010 | Asada et al. |
| RE41,765 E | 9/2010 | Gregory et al. |
| 7,827,620 B2 | 11/2010 | Feher |
| 7,827,805 B2 | 11/2010 | Comiskey et al. |
| 7,862,113 B2 | 1/2011 | Knoll |
| 7,866,017 B2 | 1/2011 | Knoll |
| 7,877,827 B2 | 2/2011 | Marquette et al. |
| 7,927,805 B2 | 4/2011 | Raponi et al. |
| 7,937,789 B2 | 5/2011 | Feher |
| 7,963,594 B2 | 6/2011 | Wolas |
| 7,966,835 B2 | 6/2011 | Petrovski |
| 7,969,738 B2 | 6/2011 | Koo |
| 7,996,936 B2 | 8/2011 | Marquette et al. |
| 8,062,797 B2 | 11/2011 | Fisher et al. |
| 8,065,763 B2 | 11/2011 | Brykalski et al. |
| 8,104,295 B2 | 1/2012 | Lofy |
| 8,143,554 B2 | 3/2012 | Lofy |
| 8,181,290 B2 | 5/2012 | Brykalski et al. |
| 8,191,187 B2 | 6/2012 | Brykalski et al. |
| 8,222,511 B2 | 7/2012 | Lofy |
| 8,256,236 B2 | 9/2012 | Lofy |
| 8,332,975 B2 | 12/2012 | Brykalski et al. |
| 8,402,579 B2 | 3/2013 | Marquette et al. |
| 8,418,286 B2 | 4/2013 | Brykalski et al. |
| 8,434,314 B2 | 5/2013 | Comiskey et al. |
| 8,438,863 B2 | 5/2013 | Lofy |
| RE44,272 E | 6/2013 | Bell |
| 8,505,320 B2 | 8/2013 | Lofy |
| 8,516,842 B2 | 8/2013 | Petrovski |
| 8,539,624 B2 | 9/2013 | Terech et al. |
| 8,575,518 B2 | 11/2013 | Walsh |
| 8,621,687 B2 | 1/2014 | Brykalski et al. |
| 8,732,874 B2 | 5/2014 | Brykalski et al. |
| 8,782,830 B2 | 7/2014 | Brykalski et al. |
| 8,893,329 B2 | 11/2014 | Petrovski |
| 8,969,703 B2 | 3/2015 | Makansi et al. |
| 9,105,808 B2 | 8/2015 | Petrovski |
| 9,105,809 B2 | 8/2015 | Lofy |
| 9,121,414 B2 | 9/2015 | Lofy et al. |
| 9,125,497 B2 | 9/2015 | Brykalski et al. |
| 9,310,112 B2 | 4/2016 | Bell et al. |
| 9,335,073 B2 | 5/2016 | Lofy |
| 9,445,524 B2 | 9/2016 | Lofy et al. |
| 9,451,723 B2 | 9/2016 | Lofy et al. |
| 9,603,459 B2 | 3/2017 | Brykalski et al. |
| 9,622,588 B2 | 4/2017 | Brykalski et al. |
| 9,651,279 B2 | 5/2017 | Lofy |
| 9,662,962 B2 | 5/2017 | Steinman et al. |
| 9,685,599 B2 | 6/2017 | Petrovski et al. |
| 9,814,641 B2 | 11/2017 | Brykalski et al. |
| 9,857,107 B2 | 1/2018 | Inaba et al. |
| 9,989,267 B2 | 6/2018 | Brykalski et al. |
| 10,005,337 B2 | 6/2018 | Petrovski |
| 2001/0005990 A1 | 7/2001 | Kim et al. |
| 2001/0014212 A1 | 8/2001 | Rutherford |
| 2001/0028185 A1 | 10/2001 | Stowe et al. |
| 2002/0017102 A1 | 2/2002 | Bell |
| 2002/0026226 A1 | 2/2002 | Ein |
| 2002/0062854 A1 | 5/2002 | Sharp |
| 2002/0092308 A1 | 7/2002 | Bell |
| 2002/0100121 A1 | 8/2002 | Kocurek |
| 2002/0108380 A1 | 8/2002 | Nelsen et al. |
| 2002/0121094 A1 | 9/2002 | VanHoudt |
| 2002/0195844 A1 | 12/2002 | Hipwell |
| 2003/0019044 A1 | 1/2003 | Larsson et al. |
| 2003/0039298 A1 | 2/2003 | Eriksson et al. |
| 2003/0041892 A1 | 3/2003 | Fleurial et al. |
| 2003/0070235 A1 | 4/2003 | Suzuki et al. |
| 2003/0084511 A1 | 5/2003 | Salvatini et al. |
| 2003/0110779 A1 | 6/2003 | Otey et al. |
| 2003/0133492 A1 | 7/2003 | Watanabe |
| 2003/0145380 A1 | 8/2003 | Schmid |
| 2003/0150060 A1 | 8/2003 | Huang |
| 2003/0160479 A1 | 8/2003 | Minuth et al. |
| 2003/0188382 A1 | 10/2003 | Klamm et al. |
| 2003/0234247 A1 | 12/2003 | Stern |
| 2004/0090093 A1 | 5/2004 | Kamiya et al. |
| 2004/0098991 A1 | 5/2004 | Heyes |
| 2004/0113549 A1 | 6/2004 | Roberts et al. |
| 2004/0164594 A1 | 8/2004 | Stoewe et al. |
| 2004/0177622 A1 | 9/2004 | Harvie |
| 2004/0177876 A1 | 9/2004 | Hightower |
| 2004/0177877 A1 | 9/2004 | Hightower |
| 2004/0195870 A1 | 10/2004 | Bohlender |
| 2004/0238022 A1 | 12/2004 | Hiller et al. |
| 2004/0255364 A1 | 12/2004 | Feher |
| 2005/0011009 A1 | 1/2005 | Wu |
| 2005/0012204 A1 | 1/2005 | Strnad |
| 2005/0056310 A1 | 3/2005 | Shikata et al. |
| 2005/0067862 A1 | 3/2005 | Iqbal et al. |
| 2005/0072165 A1 | 4/2005 | Bell |
| 2005/0076944 A1 | 4/2005 | Kanatzidis et al. |
| 2005/0078451 A1 | 4/2005 | Sauciuc et al. |
| 2005/0086739 A1 | 4/2005 | Wu |
| 2005/0121065 A1 | 6/2005 | Otey |
| 2005/0126184 A1 | 6/2005 | Cauchy |
| 2005/0140180 A1* | 6/2005 | Hesch .................. B60J 5/0452 296/208 |
| 2005/0143797 A1 | 6/2005 | Parish et al. |
| 2005/0145285 A1 | 7/2005 | Extrand |
| 2005/0161072 A1 | 7/2005 | Esser et al. |
| 2005/0173950 A1 | 8/2005 | Bajic et al. |
| 2005/0200166 A1 | 9/2005 | Noh |
| 2005/0202774 A1* | 9/2005 | Lipke .................. B60H 1/00564 454/137 |
| 2005/0220167 A1 | 10/2005 | Kanai et al. |
| 2005/0251120 A1 | 11/2005 | Anderson et al. |
| 2005/0257532 A1 | 11/2005 | Ikeda et al. |
| 2005/0268956 A1 | 12/2005 | Take |
| 2005/0278863 A1 | 12/2005 | Bahash et al. |

(56) References Cited

U.S. PATENT DOCUMENTS

| | | |
|---|---|---|
| 2005/0285438 A1 | 12/2005 | Ishima et al. |
| 2005/0288749 A1 | 12/2005 | Lachenbruch |
| 2006/0005548 A1 | 1/2006 | Ruckstuhl |
| 2006/0005944 A1 | 1/2006 | Wang et al. |
| 2006/0053529 A1 | 3/2006 | Feher |
| 2006/0078319 A1 | 4/2006 | Maran |
| 2006/0080778 A1 | 4/2006 | Chambers |
| 2006/0087160 A1 | 4/2006 | Dong et al. |
| 2006/0102224 A1 | 5/2006 | Chen et al. |
| 2006/0118158 A1 | 6/2006 | Zhang et al. |
| 2006/0123799 A1 | 6/2006 | Tateyama et al. |
| 2006/0137099 A1 | 6/2006 | Feher |
| 2006/0137358 A1 | 6/2006 | Feher |
| 2006/0157102 A1 | 7/2006 | Nakajima et al. |
| 2006/0158011 A1 | 7/2006 | Marlovits et al. |
| 2006/0162074 A1 | 7/2006 | Bader |
| 2006/0175877 A1 | 8/2006 | Alionte et al. |
| 2006/0197363 A1 | 9/2006 | Lofy et al. |
| 2006/0200398 A1 | 9/2006 | Botton et al. |
| 2006/0201161 A1 | 9/2006 | Hirai et al. |
| 2006/0201162 A1 | 9/2006 | Hsieh |
| 2006/0214480 A1 | 9/2006 | Terech |
| 2006/0219699 A1 | 10/2006 | Geisel et al. |
| 2006/0225441 A1 | 10/2006 | Goenka et al. |
| 2006/0225773 A1 | 10/2006 | Venkatasubramanian et al. |
| 2006/0237166 A1 | 10/2006 | Otey et al. |
| 2006/0243317 A1 | 11/2006 | Venkatasubramanian |
| 2006/0244289 A1 | 11/2006 | Bedro |
| 2006/0273646 A1 | 12/2006 | Comiskey et al. |
| 2007/0017666 A1 | 1/2007 | Goenka et al. |
| 2007/0035162 A1 | 2/2007 | Bier et al. |
| 2007/0040421 A1 | 2/2007 | Zuzga et al. |
| 2007/0069554 A1 | 3/2007 | Comiskey et al. |
| 2007/0086757 A1 | 4/2007 | Feher |
| 2007/0095378 A1 | 5/2007 | Ito et al. |
| 2007/0095383 A1 | 5/2007 | Tajima |
| 2007/0101602 A1 | 5/2007 | Bae et al. |
| 2007/0107450 A1 | 5/2007 | Sasao et al. |
| 2007/0138844 A1 | 6/2007 | Kim |
| 2007/0142883 A1 | 6/2007 | Quincy, III |
| 2007/0145808 A1 | 6/2007 | Minuth et al. |
| 2007/0157630 A1 | 7/2007 | Kadle et al. |
| 2007/0158981 A1 | 7/2007 | Almasi et al. |
| 2007/0163269 A1 | 7/2007 | Chung et al. |
| 2007/0190712 A1 | 8/2007 | Lin et al. |
| 2007/0193279 A1 | 8/2007 | Yoneno et al. |
| 2007/0200398 A1 | 8/2007 | Wolas et al. |
| 2007/0214956 A1 | 9/2007 | Carlson et al. |
| 2007/0227158 A1 | 10/2007 | Kuchimachi |
| 2007/0234742 A1 | 10/2007 | Aoki et al. |
| 2007/0241592 A1 | 10/2007 | Giffin et al. |
| 2007/0251016 A1 | 11/2007 | Feher |
| 2007/0256722 A1 | 11/2007 | Kondoh |
| 2007/0261412 A1 | 11/2007 | Heine |
| 2007/0261413 A1 | 11/2007 | Hatamian et al. |
| 2007/0261548 A1 | 11/2007 | Vrzalik et al. |
| 2007/0262621 A1 | 11/2007 | Dong et al. |
| 2007/0296251 A1 | 12/2007 | Krobok et al. |
| 2008/0000025 A1 | 1/2008 | Feher |
| 2008/0022694 A1 | 1/2008 | Anderson et al. |
| 2008/0023056 A1 | 1/2008 | Kambe et al. |
| 2008/0028536 A1 | 2/2008 | Hadden-Cook |
| 2008/0028768 A1 | 2/2008 | Goenka |
| 2008/0028769 A1 | 2/2008 | Goenka |
| 2008/0053108 A1 | 3/2008 | Wen |
| 2008/0053509 A1 | 3/2008 | Flitsch et al. |
| 2008/0077211 A1 | 3/2008 | Levinson et al. |
| 2008/0078186 A1 | 4/2008 | Cao |
| 2008/0084095 A1 | 4/2008 | Wolas |
| 2008/0087316 A1 | 4/2008 | Inaba et al. |
| 2008/0143152 A1* | 6/2008 | Wolas .................. B60N 2/5635 297/180.14 |
| 2008/0154518 A1 | 6/2008 | Manaka et al. |
| 2008/0155990 A1 | 7/2008 | Gupta et al. |
| 2008/0163916 A1 | 7/2008 | Tsuneoka et al. |
| 2008/0164733 A1 | 7/2008 | Giffin et al. |
| 2008/0166224 A1 | 7/2008 | Giffin et al. |
| 2008/0245092 A1 | 10/2008 | Forsberg et al. |
| 2008/0263776 A1 | 10/2008 | O'Reagan |
| 2008/0289677 A1 | 11/2008 | Bell et al. |
| 2008/0307796 A1 | 12/2008 | Bell et al. |
| 2009/0000031 A1 | 1/2009 | Feher |
| 2009/0015042 A1 | 1/2009 | Bargheer et al. |
| 2009/0026813 A1 | 1/2009 | Lofy |
| 2009/0033130 A1 | 2/2009 | Marquette et al. |
| 2009/0106907 A1 | 4/2009 | Chambers |
| 2009/0108094 A1 | 4/2009 | Ivri |
| 2009/0126110 A1 | 5/2009 | Feher |
| 2009/0178700 A1 | 7/2009 | Heremans et al. |
| 2009/0211619 A1 | 8/2009 | Sharp et al. |
| 2009/0218855 A1 | 9/2009 | Wolas |
| 2009/0235969 A1 | 9/2009 | Heremans et al. |
| 2009/0269584 A1 | 10/2009 | Bell et al. |
| 2009/0293488 A1 | 12/2009 | Coughlan, III et al. |
| 2010/0132379 A1 | 6/2010 | Wu |
| 2010/0132380 A1 | 6/2010 | Robinson, II |
| 2010/0133883 A1 | 6/2010 | Walker |
| 2010/0153066 A1 | 6/2010 | Federer et al. |
| 2010/0154437 A1 | 6/2010 | Nepsha |
| 2010/0154911 A1 | 6/2010 | Yoskowitz |
| 2010/0198322 A1 | 8/2010 | Joseph et al. |
| 2010/0307168 A1 | 12/2010 | Kohl et al. |
| 2011/0066217 A1 | 3/2011 | Diller et al. |
| 2011/0101741 A1 | 5/2011 | Kolich |
| 2011/0226751 A1 | 9/2011 | Lazanja et al. |
| 2011/0271994 A1 | 11/2011 | Gilley |
| 2011/0289684 A1 | 12/2011 | Parish et al. |
| 2012/0003510 A1 | 1/2012 | Eisenhour |
| 2012/0017371 A1 | 1/2012 | Pollard |
| 2012/0080911 A1 | 4/2012 | Brykalski et al. |
| 2012/0198616 A1 | 8/2012 | Makansi et al. |
| 2012/0235444 A1 | 9/2012 | Dilley et al. |
| 2012/0239123 A1 | 9/2012 | Weber et al. |
| 2012/0261399 A1 | 10/2012 | Lofy |
| 2012/0289761 A1 | 11/2012 | Boyden et al. |
| 2013/0008181 A1 | 1/2013 | Makansi et al. |
| 2013/0086923 A1 | 4/2013 | Petrovski et al. |
| 2013/0097777 A1 | 4/2013 | Marquette et al. |
| 2013/0125563 A1 | 5/2013 | Jun |
| 2013/0206852 A1 | 8/2013 | Brykalski et al. |
| 2013/0232996 A1* | 9/2013 | Goenka .................. B60N 2/56 62/3.61 |
| 2013/0239592 A1 | 9/2013 | Lofy |
| 2014/0026320 A1 | 1/2014 | Marquette et al. |
| 2014/0030082 A1 | 1/2014 | Helmenstein |
| 2014/0041396 A1 | 2/2014 | Makansi et al. |
| 2014/0090513 A1 | 4/2014 | Zhang et al. |
| 2014/0090829 A1 | 4/2014 | Petrovski |
| 2014/0113536 A1* | 4/2014 | Goenka .............. B60H 1/00028 454/152 |
| 2014/0131343 A1 | 5/2014 | Walsh |
| 2014/0137569 A1 | 5/2014 | Parish et al. |
| 2014/0159442 A1 | 6/2014 | Helmenstein |
| 2014/0180493 A1 | 6/2014 | Csonti et al. |
| 2014/0187140 A1 | 7/2014 | Lazanja et al. |
| 2014/0194959 A1 | 7/2014 | Fries et al. |
| 2014/0237719 A1 | 8/2014 | Brykalski et al. |
| 2014/0250918 A1 | 9/2014 | Lofy |
| 2014/0256244 A1 | 9/2014 | Sakurai et al. |
| 2014/0260331 A1 | 9/2014 | Lofy et al. |
| 2014/0305625 A1 | 10/2014 | Petrovski |
| 2014/0338366 A1 | 11/2014 | Adldinger et al. |
| 2015/0176870 A1 | 6/2015 | Inaba et al. |
| 2015/0238020 A1 | 8/2015 | Petrovski et al. |
| 2016/0030234 A1 | 2/2016 | Lofy et al. |
| 2016/0053772 A1 | 2/2016 | Lofy et al. |
| 2016/0133817 A1 | 5/2016 | Makansi et al. |
| 2016/0137110 A1 | 5/2016 | Lofy et al. |
| 2016/0152167 A1 | 6/2016 | Kozlowski |
| 2016/0304013 A1 | 10/2016 | Wolas et al. |
| 2016/0320104 A1 | 11/2016 | Lofy |
| 2017/0071359 A1 | 3/2017 | Petrovski et al. |
| 2017/0181225 A1 | 6/2017 | Inaba et al. |

(56) References Cited

U.S. PATENT DOCUMENTS

| | | |
|---|---|---|
| 2017/0284710 A1 | 10/2017 | Petrovski et al. |
| 2018/0172325 A1 | 6/2018 | Inaba et al. |
| 2018/0213942 A1 | 8/2018 | Marquette et al. |

FOREIGN PATENT DOCUMENTS

| | | |
|---|---|---|
| CN | 1299950 | 6/2001 |
| CN | 1320087 | 10/2001 |
| CN | 1929761 | 3/2007 |
| CN | 101 219 025 | 7/2008 |
| DE | 195 03 291 | 8/1996 |
| DE | 199 12 764 | 9/2000 |
| DE | 299 11 519 | 11/2000 |
| DE | 102 38 552 | 8/2001 |
| DE | 101 15 242 | 10/2002 |
| DE | 201 20 516 | 4/2003 |
| DE | 10 2009 036 332 | 2/2011 |
| EP | 0 424 160 | 4/1991 |
| EP | 0 411 375 | 5/1994 |
| EP | 0 621 026 | 10/1994 |
| EP | 0 834 421 | 4/1998 |
| EP | 0 862 901 | 9/1998 |
| EP | 1 598 223 | 11/2005 |
| EP | 1 972 312 | 9/2008 |
| EP | 1 845 914 | 9/2009 |
| EP | 2 073 669 | 11/2012 |
| EP | 2 921 083 | 9/2015 |
| FR | 2 893 826 | 6/2007 |
| GB | 874660 | 8/1961 |
| GB | 978057 | 12/1964 |
| JP | 56-097416 | 8/1981 |
| JP | 58-185952 | 10/1983 |
| JP | 60-080044 | 5/1985 |
| JP | 60-085297 | 5/1985 |
| JP | 01-281344 | 11/1989 |
| JP | 04-052470 | 6/1990 |
| JP | 04-165234 | 6/1992 |
| JP | 04-107656 | 7/1992 |
| JP | 05-026762 | 2/1993 |
| JP | 05-277020 | 10/1993 |
| JP | 10-044756 | 2/1998 |
| JP | 10-227508 | 8/1998 |
| JP | 10-297243 | 11/1998 |
| JP | 10-332883 | 12/1998 |
| JP | 2000-060681 | 2/2000 |
| JP | 2006-076398 | 3/2000 |
| JP | 2000-164945 | 6/2000 |
| JP | 2001-174028 | 6/2001 |
| JP | 2001-208405 | 8/2001 |
| JP | 2002-514735 | 5/2002 |
| JP | 2002-227798 | 8/2002 |
| JP | 2003-204087 | 7/2003 |
| JP | 2003-254636 | 9/2003 |
| JP | 2004-055621 | 2/2004 |
| JP | 2004-174138 | 6/2004 |
| JP | 2005-079210 | 2/2005 |
| JP | 2005-333083 | 12/2005 |
| JP | 2006-001392 | 1/2006 |
| JP | 2006-021572 | 1/2006 |
| KR | 2001-0060500 | 7/2001 |
| KR | 10-2005-0011494 | 1/2005 |
| LU | 66619 | 2/1973 |
| WO | WO 94/020801 | 9/1994 |
| WO | WO 95/014899 | 6/1995 |
| WO | WO 95/031688 | 11/1995 |
| WO | WO 96/005475 | 2/1996 |
| WO | WO 98/007898 | 2/1998 |
| WO | WO 98/0031311 | 7/1998 |
| WO | WO 99/023980 | 5/1999 |
| WO | WO 99/044552 | 9/1999 |
| WO | WO 99/058907 | 11/1999 |
| WO | WO 02/011968 | 2/2002 |
| WO | WO 02/053400 | 7/2002 |
| WO | WO 02/058165 | 7/2002 |
| WO | WO 03/014634 | 2/2003 |
| WO | WO 03/051666 | 6/2003 |
| WO | WO 03/063257 | 7/2003 |
| WO | WO 2004/011861 | 2/2004 |
| WO | WO 2005/115794 | 12/2005 |
| WO | WO 2006/078394 | 7/2006 |
| WO | WO 2007/060371 | 5/2007 |
| WO | WO 2007/089789 | 8/2007 |
| WO | WO 2007/142972 | 12/2007 |
| WO | WO 2008/045964 | 4/2008 |
| WO | WO 2008/046110 | 4/2008 |
| WO | WO 2008/057962 | 5/2008 |
| WO | WO 2008/076588 | 6/2008 |
| WO | WO 2008/086499 | 7/2008 |
| WO | WO 2008/115831 | 9/2008 |
| WO | WO 2009/015235 | 1/2009 |
| WO | WO 2009/036077 | 3/2009 |
| WO | WO 2009/097572 | 8/2009 |
| WO | WO 2010/009422 | 1/2010 |
| WO | WO 2010/088405 | 8/2010 |
| WO | WO 2010/129803 | 11/2010 |
| WO | WO 2011/026040 | 3/2011 |
| WO | WO 2011/156643 | 12/2011 |
| WO | WO 2012/061777 | 5/2012 |
| WO | WO 2013/052823 | 4/2013 |
| WO | WO 2014/164887 | 10/2014 |
| WO | WO 2015/085150 | 6/2015 |
| WO | WO 2015/123585 | 8/2015 |
| WO | WO 2016/130840 | 8/2016 |

OTHER PUBLICATIONS

U.S. Appl. No. 15/685,912, filed Aug. 24, 2017, Petrovski et al.
U.S. Appl. No. 14/821,514, filed Aug. 7, 2015, Lofy.
U.S. Appl. No. 15/842,535, filed Dec. 14, 2017, Inaba et al.
U.S. Appl. No. 15/880,433, filed Jan. 25, 2018, Marquette et al.
U.S. Appl. No. 15/994,275, filed May 31, 2018, Brykalski et al.
Luo, Zhaoxia, "A Simple Method to Estimate the Physical Characteristics of a Thermoelectric Cooler from Vendor Datasheets", Electronics Cooling, Aug. 2008, in 17 pages from https://www.electronics-cooling.com/2008/08/a-simple-method-to-estimate-the-physical-characteristics-of-a-thermoelectric-cooler-from-vendor-datasheets/.
U.S. Appl. No. 14/864,704, filed Sep. 24, 2015, Terech et al.
U.S. Appl. No. 15/118,441, filed Aug. 11, 2016, Inaba et al.
U.S. Appl. No. 15/467,830, filed Mar. 23, 2017, Brykalski et al.
Feher, Steve, "Thermoelectric Air Conditioned Variable Temperature Seat (VTS) & Effect Upon Vehicle Occupant Comfort, Vehicle Energy Efficiency, and Vehicle Environment Compatibility", SAE Technical Paper, Apr. 1993, pp. 341-349.
Lofy et al., "Thermoelectrics for Environmental Control in Automobiles", Proceeding of Twenty-First International Conference on Thermoelectrics (ICT 2002), 2002, pp. 471-476.
Photographs and accompanying description of climate control seat assembly system components publicly disclosed as early as Jan. 1998.
Photographs and accompanying description of a component of a climate control seat assembly system sold prior to Nov. 1, 2005.
Photographs and accompanying description of a component of a climate control seat assembly system sold prior to Dec. 20, 2003.
Japanese Office Action re JP Patent Application No. 2011-518941, dated Oct. 18, 2013 in 5 pages, along with its English translation as translated by a foreign associate.

* cited by examiner

VEHICLE HEADLINER ASSEMBLY FOR ZONAL COMFORT

CROSS-REFERENCE TO RELATED APPLICATIONS

This application is a continuation of U.S. patent application Ser. No. 14/532,892, filed Nov. 4, 2014, which claims the priority benefit under 35 U.S.C. § 119(e) of U.S. Provisional Patent Application No. 61/900,334, filed Nov. 5, 2013, the entirety of each of which is hereby incorporated by reference herein and made a part of the present application.

BACKGROUND

Field

This application relates to climate control, and more specifically, to zonal conditioning systems for vehicles and/or other spaces or areas.

Description of the Related Art

Temperature-conditioned and/or ambient air for environmental control of vehicles (e.g., automobiles) and/or living or working spaces is typically provided to relatively extensive areas. In the case of enclosed or semi-enclosed areas, such as vehicle interiors, homes, offices and the like, the interior space is typically cooled or heated as a unit. There are many situations; however, in which more selective or restrictive air temperature modification is desirable. For example, it is often desirable to provide an individualized climate control zones for certain subareas or regions of such a space so that desired heating, cooling and/or ventilation can be achieved.

SUMMARY

According to some embodiments, a zonal conditioning system for a vehicle comprises a headliner assembly configured to be secured to the top surface of a vehicle interior, wherein the headliner assembly comprises a first side positioned away from the vehicle interior and hidden from the vehicle interior, and a second side positioned toward the vehicle interior, the headliner assembly comprising at least two vents through which air selectively passes. The zonal conditioning system further includes at least two fluid modules positioned along the first side of the headliner assembly, wherein each of the fluid modules comprises a fluid transfer device and an outlet. The system further includes a first fluid conduit placing the outlet of a first fluid module in fluid communication with a first vent of the headliner assembly, and a second fluid conduit placing the outlet of a second fluid module in fluid communication with a second vent of the headliner assembly, wherein at least one property of the air discharged through the first and second vents can be selectively regulated to create separate conditioning zones within the interior of the vehicle.

According to some embodiments, a method of creating at least two separate climate control zones within an interior of a vehicle comprises positioning at least two fluid modules along a first side of a headliner assembly of the vehicle, each of the fluid modules comprising a fluid transfer device and an outlet, wherein the first side of the headliner is positioned away from the vehicle interior; placing a first fluid module in fluid communication with at least one first vent of the headliner, and placing at least a second fluid module in fluid communication with at least one second vent of the headliner, wherein air is delivered from the fluid modules to and through the vents toward the interior of the vehicle, wherein at least one property of the air discharged through the first and second vents can be selectively regulated to create separate conditioning zones within the interior of the vehicle.

According to some embodiments, at least one of the fluid modules comprises a thermal conditioning device (e.g., thermoelectric device, convective heater, another heating or cooling device, etc.). In some embodiments, the method further comprises positioning at least one waste conduit in fluid communication with at least one of the fluid modules for transferring waste fluid from the at least one of the fluid modules to a location exterior of the vehicle. In some embodiments, the waste conduit comprises a conduit routed at least partially through a pillar of the vehicle. In some embodiments, the waste conduit comprises a conduit routed at least partially through a package tray of the vehicle.

According to some embodiments, the at least one property of the air discharged through the first and second vents comprises at least one of the following: airflow rate, whether thermal conditioning occurs, a level of thermal conditioning and/or the like. In some embodiments, at least one of the fluid modules is automatically regulated using an automated control scheme. In some embodiments, at least one of the fluid modules is manually regulated by a user. In some embodiments, the method further comprises positioning at least one controller within the vehicle to enable a user to selectively regulate at least one operational aspect of at least of the fluid modules.

BRIEF DESCRIPTION OF THE DRAWINGS

These and other features, aspects and advantages of the present inventions are described with reference to drawings of certain preferred embodiments, which are intended to illustrate, but not to limit, the present inventions. It is to be understood that the attached drawings are provided for the purpose of illustrating concepts of the present inventions and may not be to scale.

DETAILED DESCRIPTION

According to some embodiments, a zonal conditioning system can be used to selectively direct thermally-conditioned and/or ambient air to one or more locations within the interior of an automobile, other vehicle or other at least partially-enclosed space. As discussed in greater detail herein, in some embodiments, the zonal conditioning system can be configured to provide a different type of air (e.g., heated air, cooled air, ambient air, etc.) to or near one or more areas within the vehicle interior. For example, separate fluid streams can be used to condition (e.g., thermally condition) one or more of the following areas within a vehicle interior: the area at or near the driver, the area at or near the front passenger, the area at or near a rear passenger (e.g., second row, third row, etc.), the trunk and/or the like.

Although various concepts are described herein with specific reference to an automobile or other vehicle, the disclosed embodiments can be adapted for inclusion in any other enclosed or partially-enclosed space, such as, for example, an office, a room and/or the like.

Figure 2:
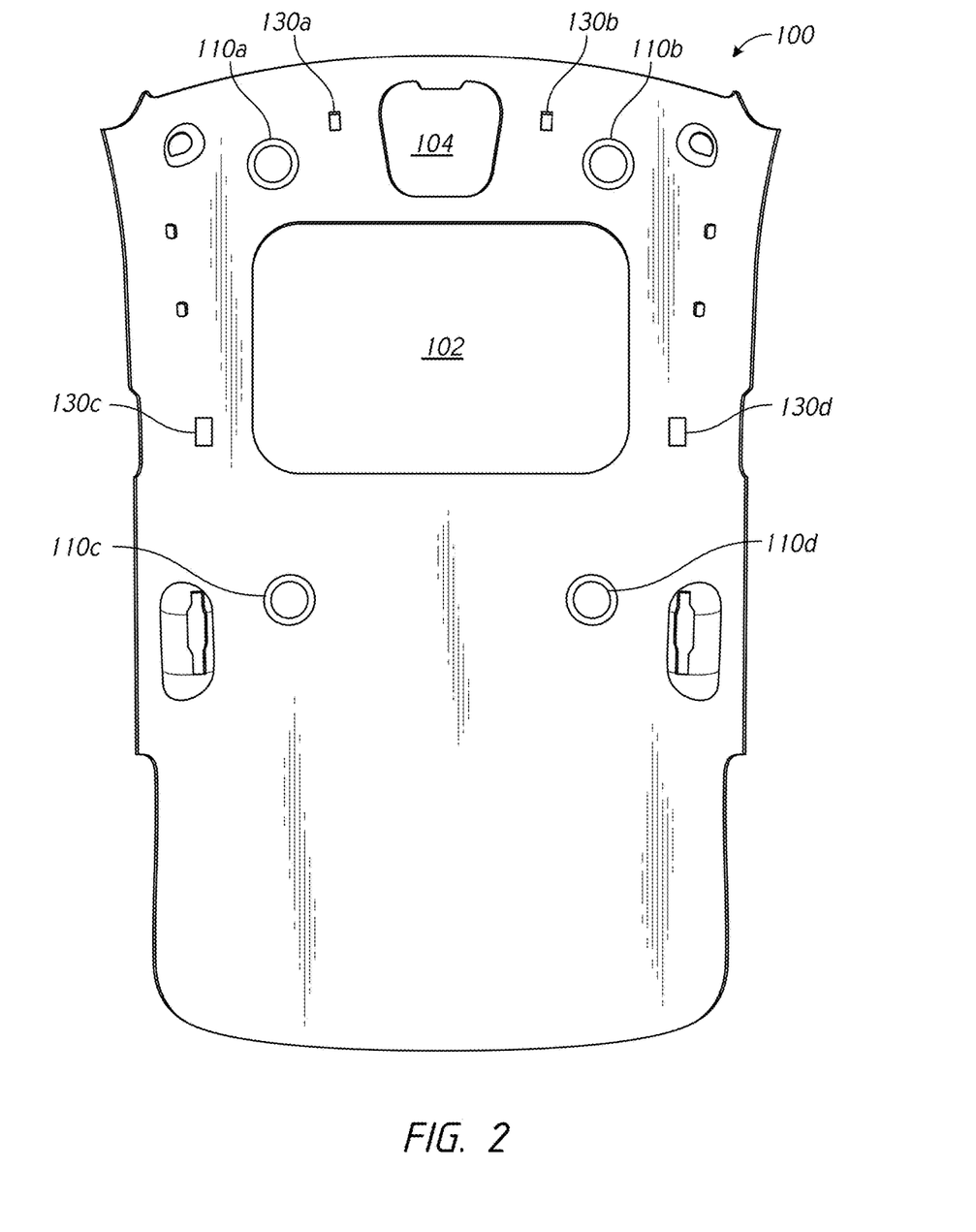
FIG. 2 illustrates a view of the lower, exposed surface of a climate conditioned headliner assembly for use in a vehicle.

FIG. 2 illustrates one embodiment of a headliner assembly 100 of a zonal conditioning system configured to be used within a vehicle interior. As shown, the headliner assembly 100, which is configured to be positioned along the ceiling of the vehicle, can include one or more openings to accommodate the various design features of the vehicle into which it is placed, depending on the vehicle. For example, the headliner assembly 100 can include an opening 102 for the sunroof, moon-roof or the like. In addition, one or more other openings 104 can be included in the assembly 100 to accommodate lights, buttons, modules and/or other features. The shape, size and/or other characteristics of the headliner assembly 100 can be customized according to the vehicle into which it will be installed, as desired or required. The headliner assembly 100 and/or other components of the zonal conditioning system can be incorporated into the original manufacturing process of the vehicle (e.g., at the time the vehicle is initially assembled). Alternatively, the headliner assembly and/or other components of the zonal conditioning system can be after-market items that are installed into an already-manufactured vehicle.

With continued reference to FIG. 2, the headliner assembly 100 can include a plurality of vents or other fluid openings 110a-110d through which air (e.g., heated air, cooled air, ambient air, etc.) discharged by one or more fluid modules is routed (e.g., into the main cabin of the vehicle interior). In the illustrated embodiment, the headliner assembly 100 comprises a total of four vents 110a-110d that are generally circular in shape. However, in other embodiments, the quantity, shape, size, spacing, orientation and/or other details of the vents 110a-110d can be different than illustrated herein, as desired or required for a particular use or application. In addition, the vents 110a-110d can include one or more louvers or other adjustable features that enable users to vary the flowrate and/or direction of air being discharged therethrough.

Figure 3:
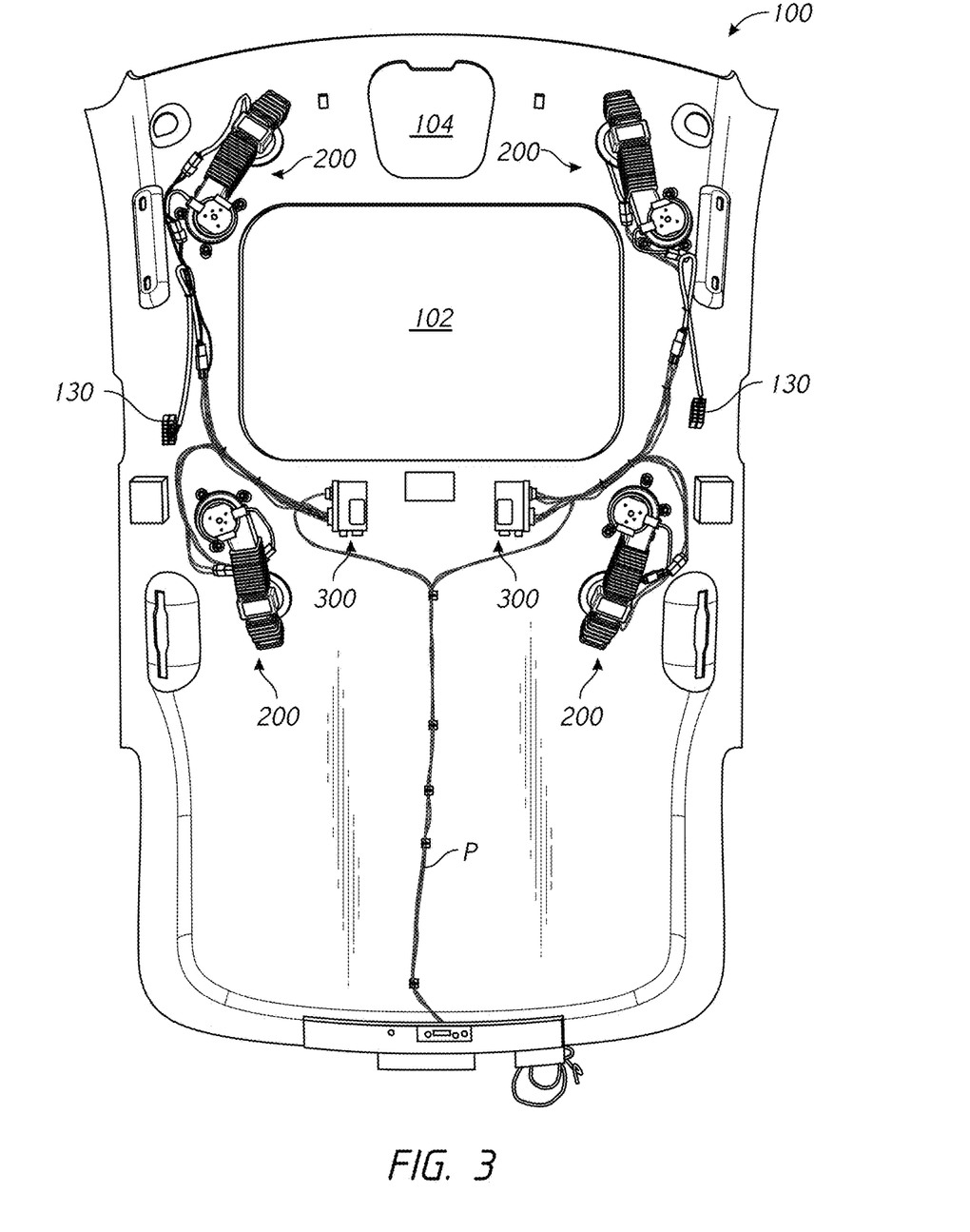
FIG. 3 illustrates a view of the upper, hidden surface of the headliner assembly of FIG. 2.

FIG. 3 illustrates the opposite (upper) surface of headliner assembly 100 shown in FIG. 2. As shown, the upper surface of the headliner assembly 100 can include one or more fluid modules 200, controllers 300, wires, cables or other electrical/communication lines, fasteners and/or the like. In the depicted arrangement, there are a total of four fluid modules 200 mounted or otherwise secured to the top or hidden surface of the assembly 100. As shown, each fluid module 200 can be positioned so that an output of the module 200 can be placed in fluid communication with a vent 110a-110d (FIG. 2). In some embodiments, a fluid module is aligned or generally aligned with a vent 110a-110d. However, alternatively, a module 200 can be placed in a different location than a vent; in such embodiments, one or more fluid conduits can be used to direct fluid from a module to a desired vent 110a-110d. Accordingly, thermally conditioned air (e.g., heated or cooled air) and/or ambient air (e.g., thermally unconditioned air) can be selectively delivered to and through the vents 110a-110d and to or near one or more regions, areas or zones of the vehicle interior. As a result, one or more properties of the fluid modules 200, such as, for example, the amount of air being discharged, if and how that air is thermally conditioned, etc., can be modified to advantageously create separate and customized conditioning zones within the vehicle.

With continued reference to FIG. 3, one or more control units or other controllers 300 can be incorporated into the zonal conditioning system. As shown, for example, the controllers 300 can be mounted to or near one or more portions of the headliner assembly 100. Each controller 300 can be configured to control or otherwise regulate one, two or more of the fluid modules 200, as desired or required by a particular application or use. In some embodiments, each fluid module 200 is associated with a single controller 300. In other embodiments, a single main control unit can at least partially regulate the operations of all fluid modules included in a particular system.

In some embodiments, the fluid module comprises at least one fluid transfer device (e.g., blower, fan, pump, etc.). In some embodiments, the fluid module is configured to environmentally and/or thermally condition (e.g., heat, cool, dehumidify, etc.) air or fluid passing therethrough. In some embodiments, the fluid module comprises at least one thermoelectric device (e.g., Peltier circuit) to selectively heat or cool air that is passed through or near the fluid module. In some embodiments, the fluid module comprises at least one convective heater and/or any other heating and/or cooling device. In some embodiments, the fluid module 200 can include a control unit or controller positioned within the same housing of the module that also encompasses the fluid transfer device (e.g., fan), thermal conditioning device (e.g., thermoelectric device, convective heater, etc.) and/or other components of the module. Additional details regarding fluid modules are provided in U.S. Pat. No. 7,587,901, filed on Jan. 31, 2005 and issued on Sep. 15, 2009, and U.S. application Ser. No. 13/289,923, filed on Nov. 4, 2011 and published as U.S. Publ. No. 2012/0114512 on May 10, 2012, the entireties of both of which are incorporated by reference herein and made a part of the present application.

In some embodiments, the fluid modules 200 are selectively controlled using one or more switches, buttons, knobs and/or other control devices 130, 130a-130d that enable a user to regulate one or more aspects of the fluid modules. As shown, the switches or control devices 130, 130a-130d can extend through the body of the headliner assembly 100 to enable a user to manipulate them along or near the headliner assembly itself. In some embodiments, the control devices comprise one or more of the following: switches, knobs, rollerballs and/or the like. Such control devices can be positioned (e.g., mounted to or near) the headliner assembly 100. Alternatively, the control devices 130, 130a-130d can be incorporated into a separate or remote assembly, such as, for example, a handheld controller, a control device or feature positioned on a seat, a center console, a ceiling console and/or the like, a touchscreen or other display of the vehicle, a smartphone, tablet or other computing device that is separate from the vehicle and/or the like, as desired or required. Regardless of their position, configuration and/or other characteristics, the control devices 130, 130a-130d can be configured to allow a user to modify one or more aspects of the fluid modules, such as, for example, which fluid modules are activated (e.g., turned on or off), how long the modules are activated, if the fluid modules are being operated to heat or cool air (or delivering ambient air), the flowrate at which air is being delivered by a fluid module, etc. Accordingly, as noted above, the level of thermal or ambient conditioning delivered to one or more zones or regions of the vehicle can be customized. In some embodiments, a user can control, for one or more zones or regions, whether to provide heated air, cooled air or ambient air. Further, the user can control a setting (e.g., low, medium, high, numeric value, etc.) for such a zonal conditioning effect.

As illustrated in FIG. 3, the various components of the zonal conditioning system (e.g., the fluid modules, controllers, control devices, etc.) can be electrically coupled to each other using one or more wires or other electrical connections. In addition, power can be supplied to fluid modules 200 and/or other components of the zonal conditioning system using a main power line P. Such a power line can be supplied with electrical power via the vehicle's main power system (e.g., the automobile battery), another centralized power source and/or a separate source of power (e.g., a separate battery, panel, etc.).

Figure 4:
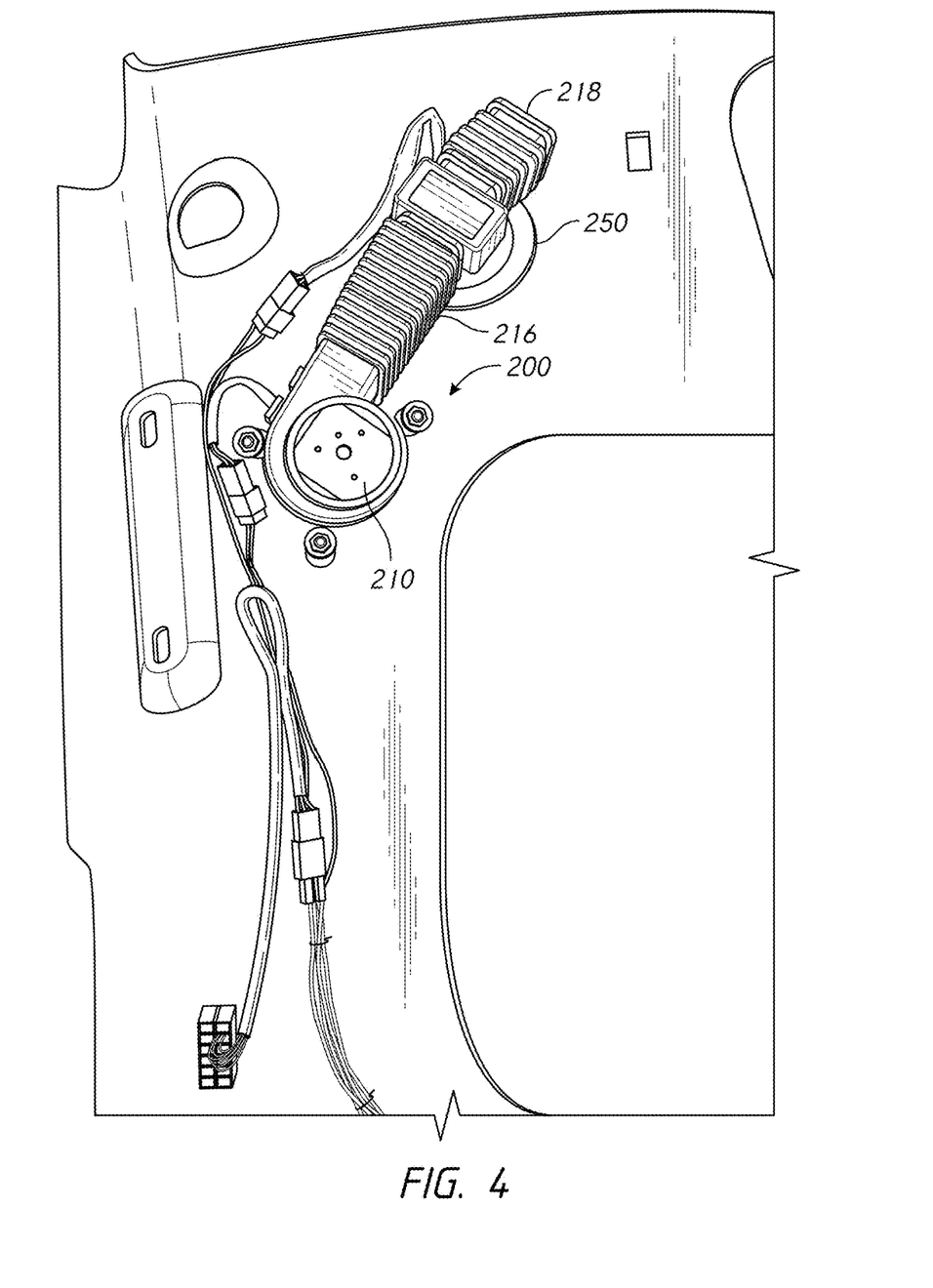
FIG. 4 illustrates a detailed view of the upper surface of the headliner assembly of FIG. 2.
Figure 5:
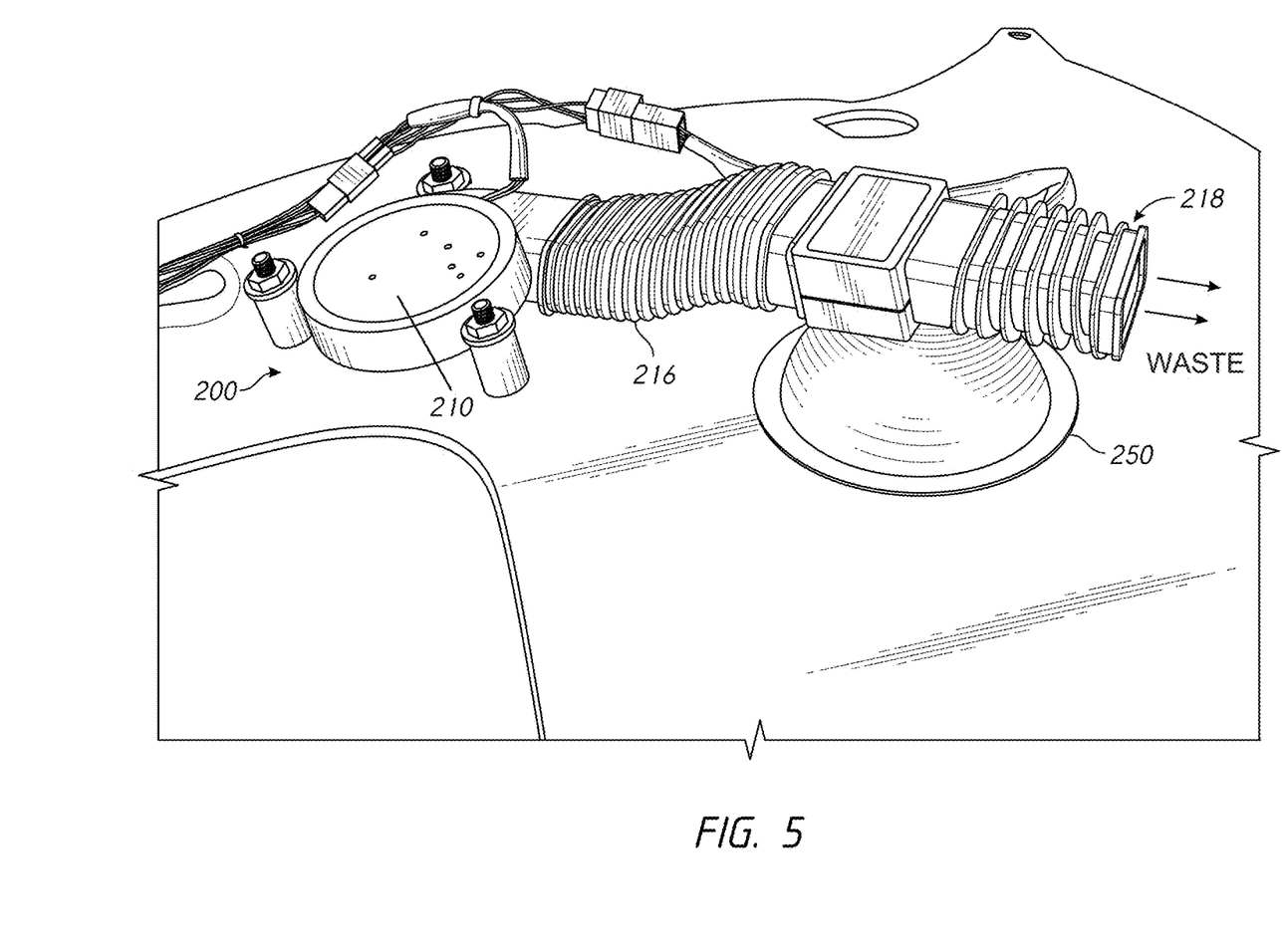
FIGS. 5 and 6 illustrate side perspective views of one embodiment of a thermal module positioned along the upper surface of the headliner assembly.
Figure 6:
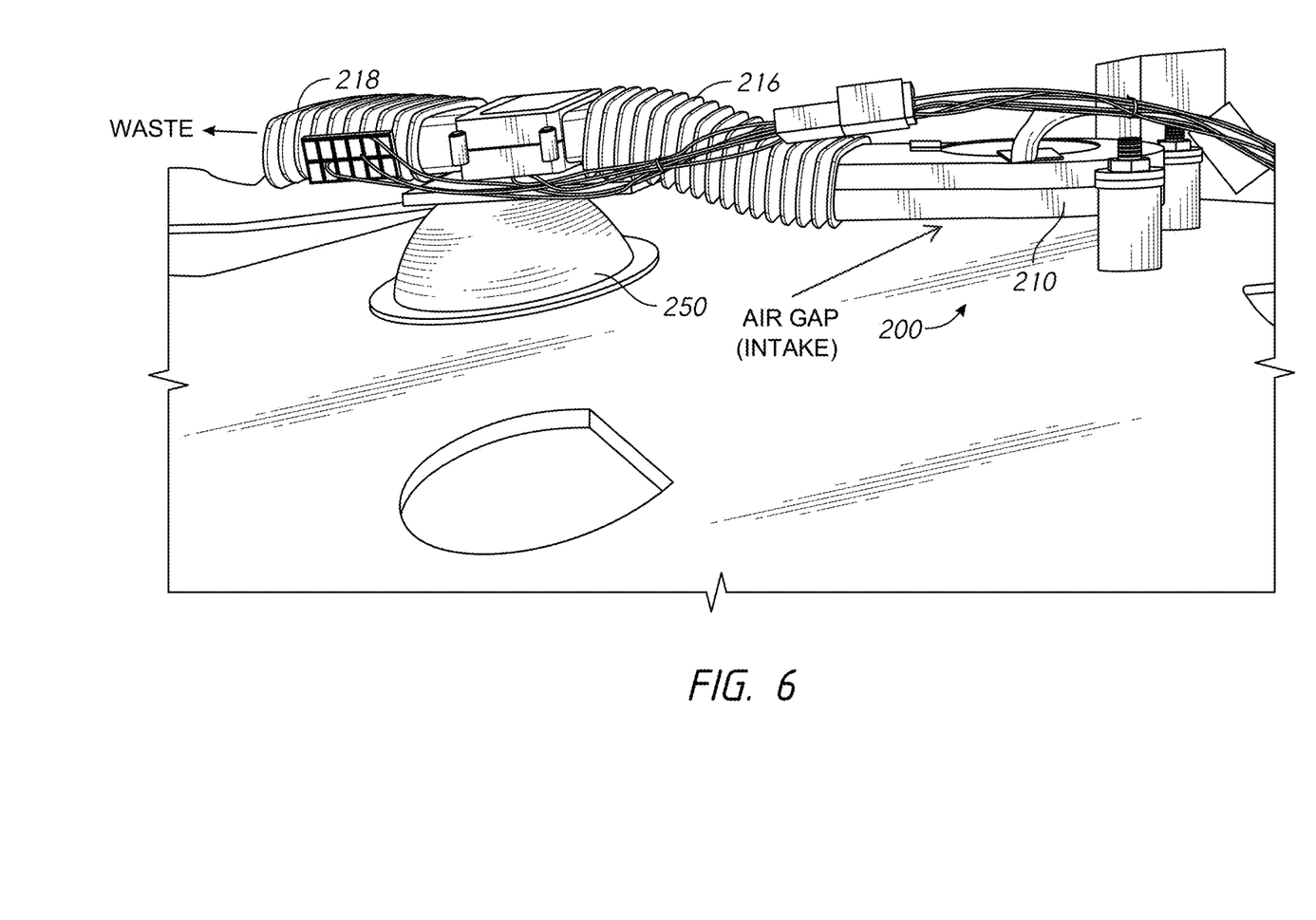

FIGS. 4 through 6 illustrate detailed views of one of the fluid modules 200 mounted to the top (hidden) surface of the headliner assembly 100. As shown, the fluid module 200 can include a blower or other fluid transfer device 210 that is configured to receive air (e.g., from the region defined between the headliner assembly 100 and the ceiling of the vehicle frame) and deliver it through one or more thermal conditioning devices (e.g., thermoelectric devices, convective heaters, other heating or cooling devices, etc.) placed in fluid communication with the blower or other fluid transfer device 210. For example, in the depicted embodiment, a thermoelectric device or other heating or cooling device (not shown) can be positioned immediately adjacent to or near the outlet of the fluid transfer device, such that air or other fluid discharged by the fluid transfer device passes near thermoelectric device (e.g., through fins, pins and/or other heat transfer devices that are in thermal communication with the thermoelectric device) to selectively heat or cool the air being transferred. In other embodiments, the fluid module 200 does not include any thermal conditioning devices or the thermal conditioning devices of the fluid module are not activated so that ambient air is transferred by the fluid transfer device, as desired or required.

As shown in FIG. 6, the fluid module 200 can be mounted so that a gap exists between the blower or other fluid transfer device 210 and the adjacent surface of the headliner assembly 100. In such arrangements, such a gap can facilitate the passage of air into the inlet of the fluid transfer device.

Figure 7:
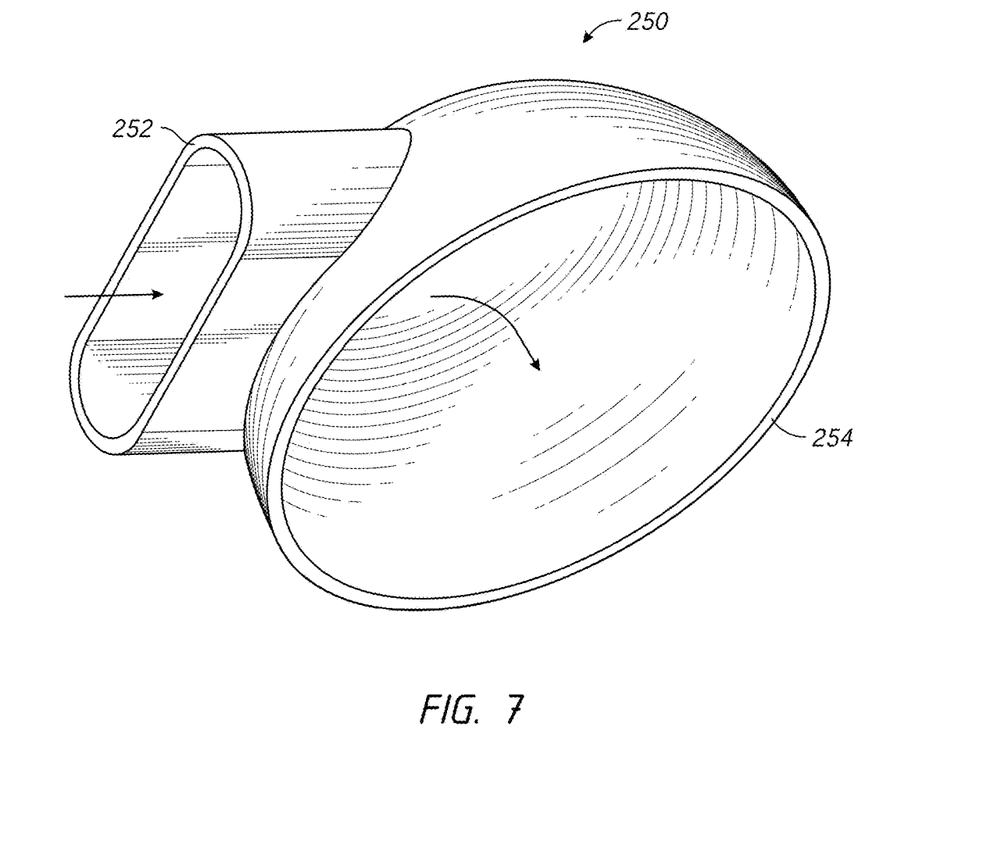
FIG. 7 illustrates a perspective view of one embodiment of an outlet coupling configured to be placed in fluid communication with a fluid module.

In some embodiments, one or more conduits or other passages 216 are used to place the air discharged by the fluid transfer device 210 to an outlet structure 250 that is mounted or otherwise positioned on the upper surface of the headliner assembly 100. The outlet structure 250 can be aligned and positioned over a vent 110*a*-110*d* (FIG. 2) of the headliner assembly 100. As illustrated in FIG. 7, the outlet structure 250 can include a cup-shaped or other curved or rounded portion 254.

Figure 1:
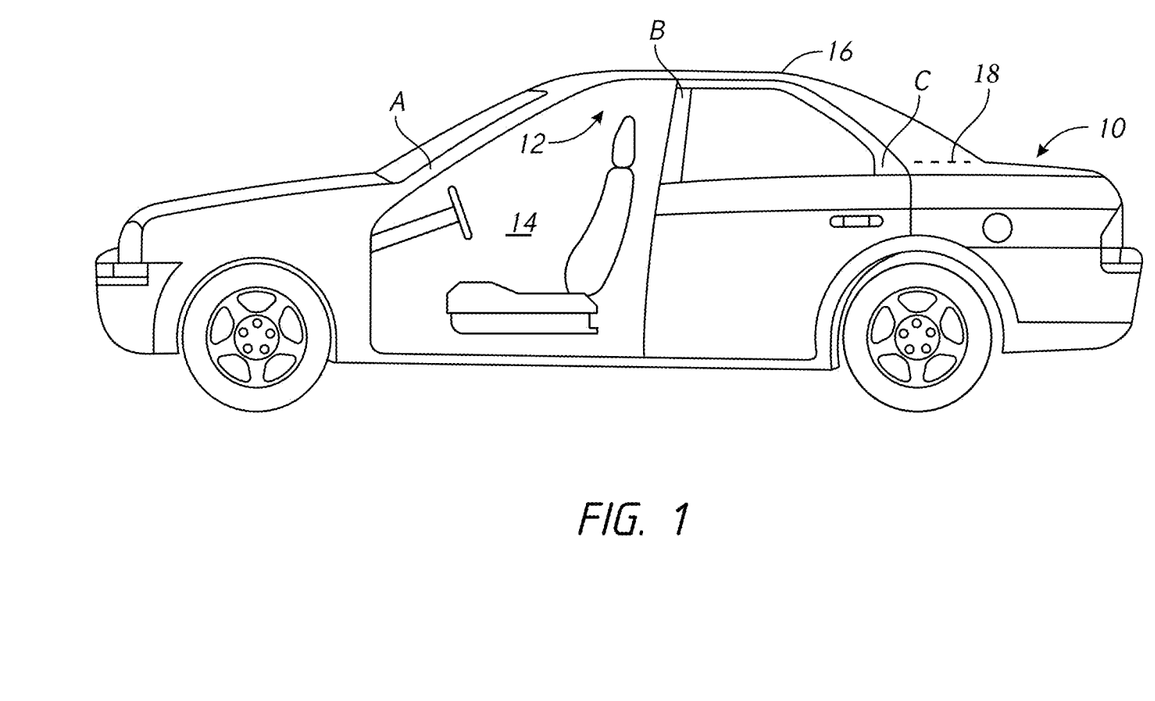
FIG. 1 illustrates a side view of an automobile configured to receive a zonal conditioning system according to one embodiment.

In some embodiments, when thermoelectric devices or similar thermal conditioning devices are used, a stream of waste fluid is created. For example, when cooled air is being delivered to and through the outlet structure and the corresponding vent 110, heated, waste air is generated. Such waste air can be delivered through one or more separate fluid conduits (or a separate passage or lumen of the conduit 216) and to waste outlet 218. In the depicted embodiment, the waste outlet 218 terminates near (e.g., shortly after) the outlet structure 250. However, in some embodiments, the waste outlet can extend, either directly or indirectly (e.g., using one or more separate conduits or channels), to one or more locations of the vehicle. In some embodiments, the waste air stream is discharged to the exterior of the vehicle. For example, in some embodiments, waste air is discharged through conduits or channels routed through one or more of the pillars of the vehicle (e.g., the A-pillar, B-pillar, C-pillar, other structural components of the vehicle, etc.). See, for example, FIG. 1. In some embodiments, air being delivered through the A-pillar can be directed to the hinge pillar before exiting the vehicle. In other embodiments, waste air can be routed through the package tray 18 of the vehicle and into the trunk or other rear portion of the vehicle. One or more flapper valves or other one-way valves can be incorporated into the waste fluid channel network to ensure that waste air does not inadvertently re-enter the interior of the vehicle.

According to some embodiments, one or more fluid modules are controlled automatically according to a pre-designated control scheme. For example, the fluid modules can be controlled (e.g., power level, on/off, flowrate, heating or cooling effect, etc.) so that a particular temperature or climate conditioning effect is maintained in one or more zones of the vehicle. For example, in some embodiments, the driver zone can be maintained relatively cool, the front passenger zone is maintained relatively warm, and a rear passenger zone is maintained in ventilation (ambient) mode. In other embodiments, the zonal conditioning system can go through a number of repeating or non-repeating cycles to alter the type of conditioning effect within the vehicle interior while accomplishing one or more other goals (e.g., power consumption), as desired or required. Accordingly, in order to assist in automated control schemes under which the zonal conditioning system can be operated, the system and/or vehicle can include one or more sensors (e.g., temperature, humidity, condensation, etc.) that can be placed in data communication with the fluid modules and/or the controllers of the system.

To assist in the description of the disclosed embodiments, words such as upward, upper, downward, lower, vertical, horizontal, upstream, downstream, top, bottom, soft, rigid, simple, complex and others have and used above to discuss various embodiments and to describe the accompanying figures. It will be appreciated, however, that the illustrated embodiments, or equivalents thereof, can be located and oriented in a variety of desired positions, and thus, should not be limited by the use of such relative terms.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while the number of variations of the inventions have been shown and described in detail, other modifications, which are within the scope of these inventions, will be readily apparent to those of skill in the art based upon this disclosure. It is also contemplated that various combinations or subcombinations of the specific features and aspects of the embodiments may be made and still fall within the scope of the inventions. Accordingly, it should be understood that various features and aspects of the disclosed embodiments can be combined with, or substituted for, one another in order to perform varying modes of the disclosed inventions. Thus, it is intended that the scope of the present inventions herein disclosed should not be limited by the particular disclosed embodiments described above, but should be determined only by a fair reading of the claims.

What is claimed is:

1. A zonal conditioning system for a vehicle, comprising:
   a headliner assembly configured to be secured to a top surface of a vehicle interior, wherein the headliner assembly comprises a first side positioned away from the vehicle interior and hidden from the vehicle interior, and wherein the headliner assembly comprises a second side positioned toward the vehicle interior, the headliner assembly comprising at least two vents through which air selectively passes;
   at least two fluid modules positioned along the first side of the headliner assembly, each of the fluid modules comprising a fluid transfer device and an outlet;
   a first fluid conduit placing the outlet of a first fluid module in fluid communication with a first vent of the headliner assembly;
   a second fluid conduit placing the outlet of a second fluid module in fluid communication with a second vent of the headliner assembly; and
   a waste conduit for transferring waste fluid to a location exterior of the vehicle, the waste conduit in fluid communication with at least one of the at least two fluid modules,
   wherein the waste conduit comprises a conduit routed at least partially through a pillar of the vehicle,
   wherein at least one property of the air passed through the first and second vents can be selectively regulated to create separate conditioning zones within the vehicle interior of the vehicle, and
   wherein the first fluid module can be selectively controlled separately from the second fluid module.

2. The zonal conditioning system of claim 1, wherein at least one of the fluid modules comprises a thermal conditioning device.

3. The zonal conditioning system of claim 2, wherein the thermal conditioning device comprises a thermoelectric device.

4. The zonal condition system of claim 2, wherein the thermal conditioning device comprises a convective heater.

5. The zonal condition system of claim 1, wherein the waste conduit comprises a conduit routed at least partially through a package tray of the vehicle.

6. The zonal condition system of claim 1, wherein the at least one property of the air passed through the first and second vents comprises at least one of the following: airflow rate, whether thermal conditioning occurs and a level of thermal conditioning.

7. The zonal condition system of claim 1, wherein at least one of the fluid modules is automatically regulated using an automated control scheme.

8. The zonal condition system of claim 1, further comprising a controller for selectively controlling at least one aspect of at least one of the fluid modules.

9. A method of creating at least two separate climate control zones within an interior of a vehicle, the method comprising:
   positioning at least two fluid modules along a first side of a headliner assembly of the vehicle, each of the fluid modules comprising a fluid transfer device and an outlet, wherein the first side of the headliner assembly is positioned away from the interior of the vehicle;
   placing a first fluid module in fluid communication with at least one first vent of the headliner assembly, and placing at least a second fluid module in fluid communication with at least one second vent of the headliner assembly, wherein air is delivered from the fluid modules to and through the first and second vents toward the interior of the vehicle; and
   positioning at least one waste conduit in fluid communication with at least one of the fluid modules for transferring waste fluid from the at least one of the fluid modules to a location exterior of the vehicle,
   wherein the waste conduit comprises a conduit routed at least partially through a pillar of the vehicle,
   wherein at least one property of the air delivered through the first and second vents can be selectively regulated to create separate conditioning zones within the interior of the vehicle, and
   wherein the first fluid module can be selectively controlled separately from the second fluid module.

10. The method of claim 9, wherein at least one of the fluid modules comprises a thermal conditioning device.

11. The method of claim 10, wherein the thermal conditioning device comprises a thermoelectric device.

12. The method of claim 10, wherein the thermal conditioning device comprises a convective heater.

13. The method of claim 9, wherein the waste conduit comprises a conduit routed at least partially through a package tray of the vehicle.

14. The method of claim 9, wherein the at least one property of the air delivered through the first and second vents comprises at least one of the following: airflow rate, whether thermal conditioning occurs and a level of thermal conditioning.

15. The method of claim 9, wherein at least one of the fluid modules is automatically regulated using an automated control scheme.

16. The method of claim 9, further comprising positioning at least one controller within the vehicle to enable a user to selectively regulate at least one operational aspect of at least of the fluid modules.

17. A zonal conditioning system for a vehicle, comprising:
   a headliner assembly configured to be secured to a top surface of a vehicle interior, wherein the headliner assembly comprises a first side positioned away from the vehicle interior and hidden from the vehicle interior, and wherein the headliner assembly comprises a second side positioned toward the vehicle interior, the headliner assembly comprising a vent through which air selectively passes;
   a fluid module positioned along the first side of the headliner assembly, the fluid module comprising a fluid transfer device and an outlet;
   a fluid conduit placing the outlet of the fluid module in fluid communication with the vent of the headliner assembly; and
   a waste conduit for transferring waste fluid to a location exterior of the vehicle, the waste conduit in fluid communication with the fluid module,
   wherein the waste conduit comprises a conduit routed at least partially through a pillar of the vehicle,
   wherein at least one property of the air passed through the vent can be selectively regulated to create a conditioning zone within the vehicle interior of the vehicle.

18. The zonal conditioning system of claim 17, wherein the fluid module comprises a thermal conditioning device.

19. The zonal conditioning system of claim 18, wherein the thermal conditioning device comprises a thermoelectric device.

20. The zonal condition system of claim 17, wherein the waste conduit comprises a conduit routed at least partially through a package tray of the vehicle.

* * * * *